US008730883B2

(12) United States Patent
Ohwatari et al.

(10) Patent No.: US 8,730,883 B2
(45) Date of Patent: May 20, 2014

(54) COORDINATED TRANSMISSION METHOD, COORDINATED TRANSMISSION SYSTEM, CENTRAL STATION AND RADIO BASE STATION

(75) Inventors: Yusuke Ohwatari, Kanagawa (JP);
Anass Benjebbour, Kanagawa (JP);
Yukihiko Okumura, Kanagawa (JP);
Junichiro Hagiwara, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 213 days.

(21) Appl. No.: 12/896,082

(22) Filed: Oct. 1, 2010

(65) Prior Publication Data

US 2011/0080884 A1 Apr. 7, 2011

(30) Foreign Application Priority Data

Oct. 1, 2009 (JP) ................................. 2009-229947

(51) Int. Cl.
*H04W 4/00* (2009.01)
(52) U.S. Cl.
USPC ............................ 370/329; 370/350; 455/450
(58) Field of Classification Search
USPC ......... 370/329, 319, 344, 208–210, 338, 281, 370/296, 346–347; 375/299, 346; 455/421, 455/422
See application file for complete search history.

(56) References Cited

U.S. PATENT DOCUMENTS

| 6,947,748 | B2 * | 9/2005 | Li et al. ........................ 455/450 |
| 7,574,179 | B2 * | 8/2009 | Barak et al. ................... 455/101 |
| 8,055,303 | B2 * | 11/2011 | Wild ........................... 455/562.1 |
| 8,379,592 | B2 * | 2/2013 | van Rensburg et al. ...... 370/330 |
| 8,396,035 | B2 * | 3/2013 | van Rensburg et al. ...... 370/330 |
| 8,520,537 | B2 * | 8/2013 | van Rensburg et al. ...... 370/252 |
| 8,542,640 | B2 * | 9/2013 | Ramprashad et al. ........ 370/329 |
| 2008/0130790 | A1 * | 6/2008 | Forenza et al. ............... 375/299 |
| 2008/0267063 | A1 * | 10/2008 | Trigui et al. .................. 370/229 |
| 2009/0067402 | A1 * | 3/2009 | Forenza et al. ............... 370/343 |

FOREIGN PATENT DOCUMENTS

| EP | 0963129 | A2 | 8/1999 |
| EP | 963129 | A2 * | 12/1999 |
| EP | 1508992 | A2 * | 2/2005 |
| EP | 963129 | B1 * | 5/2006 |

(Continued)

OTHER PUBLICATIONS

Wei Li et al., An Efficient Channel Block Diagonalization Method for Generalized Zero Forcing Assisted MIMO Broadcasting Systems, Mar. 2011, IEEE, vol. 10 No. 3, 739-744.*

(Continued)

*Primary Examiner* — Michael J Moore, Jr.
(74) *Attorney, Agent, or Firm* — MKG, LLC

(57) ABSTRACT

A coordinated transmission method of the invention has the steps of selecting a directional pattern corresponding to an area in which a radio terminal locates, from among a plurality of directional patterns determined respectively corresponding to a plurality of resources in frequency domains where the plurality of directional patterns is configured so that a plurality of radio base stations surrounding the area transmits, to the area, directional beams of same frequency domain resources to face one another, while not transmitting the directional beams of the same frequency domain resources using the same frequency domain resources to areas adjacent to the area, and of distributing a signal to transmit to the radio terminal according to the selected directional pattern, determining a frequency domain and directions of directional beams regarding the distributed signal, and delivering the signal to each of the plurality of radio base stations that simultaneously transmits the signal to the radio terminal.

13 Claims, 15 Drawing Sheets

FREQUENCY BLOCK NUMBER = 2n

(56) References Cited

FOREIGN PATENT DOCUMENTS

| | | | |
|---|---|---|---|
| EP | 1703645 A1 | * | 9/2006 |
| EP | 2182663 A1 | * | 5/2010 |
| JP | 2000-59287 | | 2/2000 |
| JP | 2004-515111 | | 5/2004 |
| JP | 2006191620 | * | 12/2005 |
| WO | 02/43278 A1 | | 5/2002 |
| WO | WO 02/43278 | * | 5/2002 |
| WO | WO 0243278 A1 | * | 5/2002 |

OTHER PUBLICATIONS

Zeng et al., Introduction Wireless and Mobile Systems, Second edition, 2006.*

Benjebbour et al., Evaluation of User Throughput for MU-MIMO Coordinated Wireless Networks, 2008, IEEE.*

Office Action with English translation, Mailing Date—Aug. 30, 2011, issued in conjunction with JP Patent Application No. 2009-229947.

Samsung, "Discussions on CoMP SU-MIMO", 3GPP Draft; R1-090613 Discussions on Combp Su-MIMO, 3rd Generation Partnership Project (3GPP), Mobile Competence Centre, 650, Route des Lucioles, F-06921 Sophia-Antipolis Cedex, France; No. Athens, Greece, Feb. 3, 2009.

Samsung, "Inter-Cell Interference Mitigation through Limited Coordination", 3GPP Draft; R1-082886 Inter-Cell Interference Mitigation through Limited Coordination; 3rd Generation Partnership Project (3GPP), Mobile Competence Centre, 650, Route des Lucioles, F-06921 Sophia-Antipolis Cedex, France; No. Jeju, Aug. 12, 2008.

Qixing Wang et al., "Coordinated Multiple Points Transmission for LTE-Advanced Systems", Wireless Communications, Networking and Mobile Computing, 2009. WICOM '09. 5th International Conference on, IEEE, Piscataway, NJ, US, Sep. 24, 2009, pp. 1-4.

Dajie Jiang et al., "Uplink Coordinated Multi-Point Reception for LTE-Advanced Systems", Wireless Communications, Networking and Mobile Computing, 2009. WICOM '09. 5th International Conference on, IEEE, Piscataway, NJ, US, Sep. 24, 2009, pp. 1-4.

Nortel, "Spatial Multiplexing in DL CoMP: Closed-Loop and Open-Loop Capacity Results", 3GPP Draft; R1-091918 (Nortel-SM_IN_DL_COMP), 3rd Generation Partnership Project (3GPP), Mobile Competence Centre, 650, Route des Lucioles, F-06921 Sophia-Antipolis Cedex, France; No. San Francisco, USA, Apr. 28, 2009.

Hitachi Ltd., "2 Adaptive eNB Clustering for CoMP", 3GPP Draft; R1-093586, 3rd Generation Partnership Project (3GPP), Mobile Competence Centre, 650, Route des Lucioles, F-06921 Sophia-Antipolis Cedex, France; No. Shenzhen, China, Aug. 24, 2009.

NTT Docomo, Inc., "Investigation on Advanced CoMP Scheme with MU-MIMO Techniques for LTE-Advanced Downlink", 3GPP Draft; R1-093504, 3rd Generation Partnership Project (3GPP), Mobile Competence Centre, 650, Route des Lucioles, F-06921 Sophia-Antipolis Cedex, France; No. Shenzhen, China, Aug. 24, 2009.

Benjebbour, Anass; et al. "Evaluation of User Throughput for MU-MIMO Coordinated Wireless Networks" IEEE PIMRC 2008; Sep. 2008; pp. 1-5.

"Downlink CoMP-MU-MIMO Transmission Schemes" CMCC; Athens, Greece. Feb. 9-13, 2009. 8 pages.

* cited by examiner

DIRECTIONAL PATTERN 1

DIRECTIONAL PATTERN 2

FREQUENCY BLOCK NUMBER = 2n+1

FREQUENCY BLOCK NUMBER = 2n

COORDINATED TRANSMISSION METHOD, COORDINATED TRANSMISSION SYSTEM, CENTRAL STATION AND RADIO BASE STATION

CROSS REFERENCE TO RELATED APPLICATION

This application is based upon and claims the benefit of priority from the prior Japanese Patent Application No. 2009-229947, filed on Oct. 1, 2009; the entire contents of which are incorporated herein by reference.

BACKGROUND OF THE INVENTION

1. Field of the Invention

The present invention relates to a coordinated transmission method, coordinated transmission system, central station and radio base station for coordinating a plurality of radio base stations to transmit signals to a radio terminal.

2. Description of Related Art

In cellular mobile radio communication systems, to improve spatial frequency usage efficiency, it is required to minimize frequency reuse factor. For example, in the 3G cellular system using the CDMA (Code Division Multiple Access) system, one-cell frequency reuse is actualized (frequency reuse factor is "1") where adjacent cells use radio signals of the same frequency band.

Meanwhile, on the downlink in the next-generation cellular system, OFDMA (Orthogonal Frequency Division Multiple Access) systems are strong. When one-cell frequency reuse is used in cellular systems using the OFDMA system, interference from adjacent cells and adjacent sectors becomes a significant cause of deterioration in characteristics. More specifically, since the SINR (Signal-to-Interference and Noise power Ratio) decreases as interfering power increases from adjacent cells and adjacent sectors, it is difficult to obtain the effects, particularly, when MIMO (Multiple-Input Multiple-Output) transmission is performed.

Accordingly, in the case that one-cell frequency reuse is used in the cellular system where MIMO transmission is performed in the OFDMA system, to obtain the effect of increasing throughput by MIMO transmission, it is necessary to avoid interference from adjacent cells and adjacent sectors.

Therefore, as the technique of avoiding interference in the above-mentioned case, attention is directed toward coordinated transmission where a plurality of radio base stations are coordinated to simultaneously transmit signals to one or more radio terminals. By this coordinated transmission, since it is possible to orthogonalize the space inside a coordinated cluster formed by a set of cells or sectors of the plurality of coordinated radio base stations, interference inside the coordinated cluster (i.e. interference among radio base station apparatuses that perform coordinated transmission) is avoided (for example, Non-patent Document 1 and Non-patent Document 2, Non-patent Document 1: A. Benjebbour, M. Shirakabe, Y. Ohwatari, J. Hagiwara, and T. Ohya, "Evaluation of user throughput for MU-MIMO coordinated wireless networks," IEEE PIMRC 2008, pp. 1-5, September 2008, Non-patent Document 2: CMCC, "Downlink CoMP-MU-MIMO transmission schemes," 3GPP RAN1 #56, R1-090922, February 2009).

More specifically, in coordinated transmission as shown in Non-patent Document 1, as shown in FIG. 1, a plurality of adjacent radio base stations 1 are connected to a central station 2, and the central station 2 coordinates the plurality of radio base stations 1. A coordinated cluster CL is formed by a set of cells C of the plurality of coordinated radio base stations 1. Inside the coordinated cluster CL is performed coordinated transmission by the plurality of radio base stations 1 by multiuser MIMO transmission. As a precoding method of the multiuser MIMO transmission, when a Block Diagonalization Zero-forcing (BD-ZF) method is used, since the space inside the coordinated cluster CL can be orthogonalized, it is possible to cancel interference inside the coordinated cluster, and user throughput is improved.

Meanwhile, in coordinated transmission as shown in Non-patent Document 2, as shown in FIG. 2, three adjacent radio base stations 1 are connected to a central station 2, and the central station 2 coordinates the radio base stations 1. A coordinated cluster CL is formed by three adjacent sectors of three coordinated radio base stations 1. Further, the three adjacent sectors forming the coordinated cluster CL are constructed so that beams from sector antennas from respective radio base stations 1 face one another. Inside the coordinated cluster CL is performed coordinated transmission by three radio base stations 1 by multiuser MIMO transmission. As a precoding method of the multiuser MIMO transmission, when the Block Diagonalization Zero-forcing (BD-ZF) method is used, since the space inside the coordinated cluster CL can be orthogonalized, it is possible to cancel interference inside the coordinated cluster, and user throughput and cell throughput is improved.

However, in the above-mentioned interference avoiding techniques using coordinated transmission by a plurality of radio base stations, although it is possible to avoid interference inside the coordinated cluster (i.e. interference among radio base stations that perform coordinated transmission), there is a problem that it is not possible to avoid interference from the outside of the coordinated cluster (i.e. interference from radio base stations that do not perform coordinated transmission).

SUMMARY OF THE INVENTION

It is an object of the present invention to provide a coordinated transmission method, coordinated transmission system, central station and radio base station capable of avoiding not only interference inside a coordinated cluster but also interference from the outside of the coordinated cluster in coordinated transmission by a plurality of radio base stations.

A coordinated transmission method of the invention is a coordinated transmission method in which a plurality of radio base stations simultaneously transmit (coordinate-transmits) signals to a radio terminal located in an area formed by adjacent sectors of the plurality of radio base stations. The method includes the steps of selecting a directional pattern corresponding to the area in which the radio terminal locates, from among a plurality of directional patterns determined respectively corresponding to a plurality of resources in frequency domains where the plurality of directional patterns is configured so that the plurality of radio base stations surrounding the area transmits, to the area, directional beams of same frequency domain resources to face one another, while not transmitting directional beams of the same frequency domain resources using the same frequency domain resources to areas adjacent to the area, and of distributing a signal to transmit to the radio terminal according to the selected directional pattern, determining a frequency domain and directions of directional beams regarding the distributed signal, and delivering the signal to each of the plurality of radio base stations that simultaneously transmits the signal to the radio terminal.

According to this embodiment, since a plurality of directional patterns to be selected corresponding to the area in which the radio terminal locates is configured so that directional beams of same frequency domain resources, which are transmitted toward the center of the area in which the radio terminal locates from the plurality of radio base stations, face one another, it is possible to prevent interference inside the area in which the radio terminal locates by coordinated transmission, while further preventing deterioration of the signal quality of the radio terminal located in the center of the area. Further, the directional patterns are configured so that directional beams of the same frequency domain resources are not transmitted to areas adjacent to the area in which the radio terminal locates, and it is thereby possible to prevent interference from inside and outside the area in which the radio terminal locates.

Further, in the coordinated transmission method in the invention, the plurality of directional patterns may be determined respectively corresponding to a plurality of resources in time domains, in addition to the plurality of resources in frequency domains.

Furthermore, in the coordinated transmission method of the present invention, the plurality of directional patterns may be determined respectively corresponding to the plurality of resources in time domains, in accordance with traffic conditions in the area.

Still furthermore, in the coordinated transmission method of the present invention, the plurality of resources in frequency domains is a plurality of frequency blocks of an OFDMA system, and the plurality of directional patterns may be determined respectively corresponding to the plurality of frequency blocks.

Moreover, in the coordinated transmission method of the present invention, the signal distributed according to the directional pattern may be delivered to each of the plurality of radio base stations that simultaneously transmits the signal to the radio terminal, by using multiuser MIMO transmission for performing precoding by a Block Diagonalization Zero-Forcing method.

A coordinated transmission system of the present invention is a coordinated transmission system in which a plurality of radio base stations simultaneously transmit signals to a radio terminal located in an area formed by adjacent sectors of the plurality of radio base stations. The coordinated transmission system includes a selection section for selecting a directional pattern corresponding to the area in which the radio terminal is located, from among a plurality of directional patterns determined respectively corresponding to a plurality of resources in frequency domains where the plurality of directional patterns are configured so that the plurality of radio base stations surrounding the area transmits, to the area, directional beams of same frequency domain resources to face one another, while not transmitting directional beams of the same frequency domain resources using the same frequency domain resources to areas adjacent to the area, and a delivery section for distributing a signal to transmit to the radio terminal according to the selected directional pattern, determining a frequency domain and directions of directional beams regarding the distributed signal, and delivering the signal to each of the plurality of radio base stations that simultaneously transmits the signal to the radio terminal.

A central station of the present invention is a central station connected to a plurality of radio base stations in a coordinated transmission system in which the plurality of radio base stations simultaneously transmit signals to a radio terminal located in an area formed by adjacent sectors of the plurality of radio base stations. In this embodiment, the central station has a selection section for selecting a directional pattern corresponding to the area in which the radio terminal is located, from among a plurality of directional patterns determined respectively corresponding to a plurality of resources in frequency domains where the plurality of directional patterns are configured so that the plurality of radio base stations surrounding the area transmits, to the area, directional beams of same frequency domain resources to face one another, while not transmitting directional beams of the same frequency domain resources using the same frequency domain resources to areas adjacent to the area, and a delivery section for distributing a signal to transmit to the radio terminal according to the selected directional pattern, determining a frequency domain and directions of directional beams regarding the distributed signal, and delivering the signal to each of the plurality of radio base stations that simultaneously transmits the signal to the radio terminal.

Further, in the central station of the present invention, the plurality of directional patterns may be determined respectively corresponding to a plurality of resources in time domains, in addition to the plurality of resources in frequency domains.

Furthermore, in the central station of the present invention, the plurality of directional patterns may be determined respectively corresponding to a plurality of resources in time domains, in accordance with traffic conditions in the area.

Still furthermore, in the central station of the present invention, the plurality of resources in frequency domains is a plurality of frequency blocks of an OFDMA system, and the plurality of directional patterns may be determined respectively corresponding to the plurality of frequency blocks.

Moreover, in the central station of the present invention, the delivery section may deliver the signal distributed according to the directional pattern to each of the plurality of radio base stations that simultaneously transmits the signal to the radio terminal, by using multiuser MIMO transmission for performing precoding by a Block Diagonalization Zero-Forcing method.

Further, in the central station of the present invention, the delivery section may include a signal distribution section for distributing the signal to transmit to the radio terminal according to the selected directional pattern, a plurality of modulation sections corresponding to the number of radio terminals that the plurality of radio base stations is capable of holding, and a plurality of transmission sections corresponding to the number of radio base stations connected to the central station, where each of the plurality of modulation sections modulates the signal distributed by the signal distribution section, and each of the plurality of transmission sections may transmit the modulated signal to each of the plurality of radio base stations that simultaneously transmits the signal to the radio terminal.

A radio base station of the present invention includes a radio base station in a coordinated transmission system in which a plurality of radio base stations simultaneously transmit signals to a radio terminal locating in an area formed by adjacent sectors of the plurality of radio base stations, and is characterized by having a selection section for selecting a directional pattern corresponding to the area in which the radio terminal locates, from among a plurality of directional patterns determined respectively corresponding to a plurality of resources in frequency domains where the plurality of directional patterns is configured so that the plurality of radio base stations surrounding the area transmits, to the area, directional beams of same frequency domain resources to face one another, while not transmitting directional beams of the same frequency domain resources using the same frequency domain resources to areas adjacent to the area, and a delivery section for distributing a signal to transmit to the radio terminal according to the selected directional pattern, determining a frequency domain and directions of directional beams regarding the distributed signal, and delivering the signal to each of the plurality of radio base stations that simultaneously transmits the signal to the radio terminal.

According to the present invention, it is possible to provide a coordination transmission method, coordinated transmission system and central station capable of avoiding not only interference inside a coordinated cluster but also interference from the outside of the coordinated cluster in coordinated transmission by a plurality of radio base stations.

DETAILED DESCRIPTION OF THE INVENTION

Embodiments of the present invention will be described below. In addition, in the following descriptions of diagrams, the same or similar part is assigned the same or similar symbol.

Embodiment 1

Figure 1:
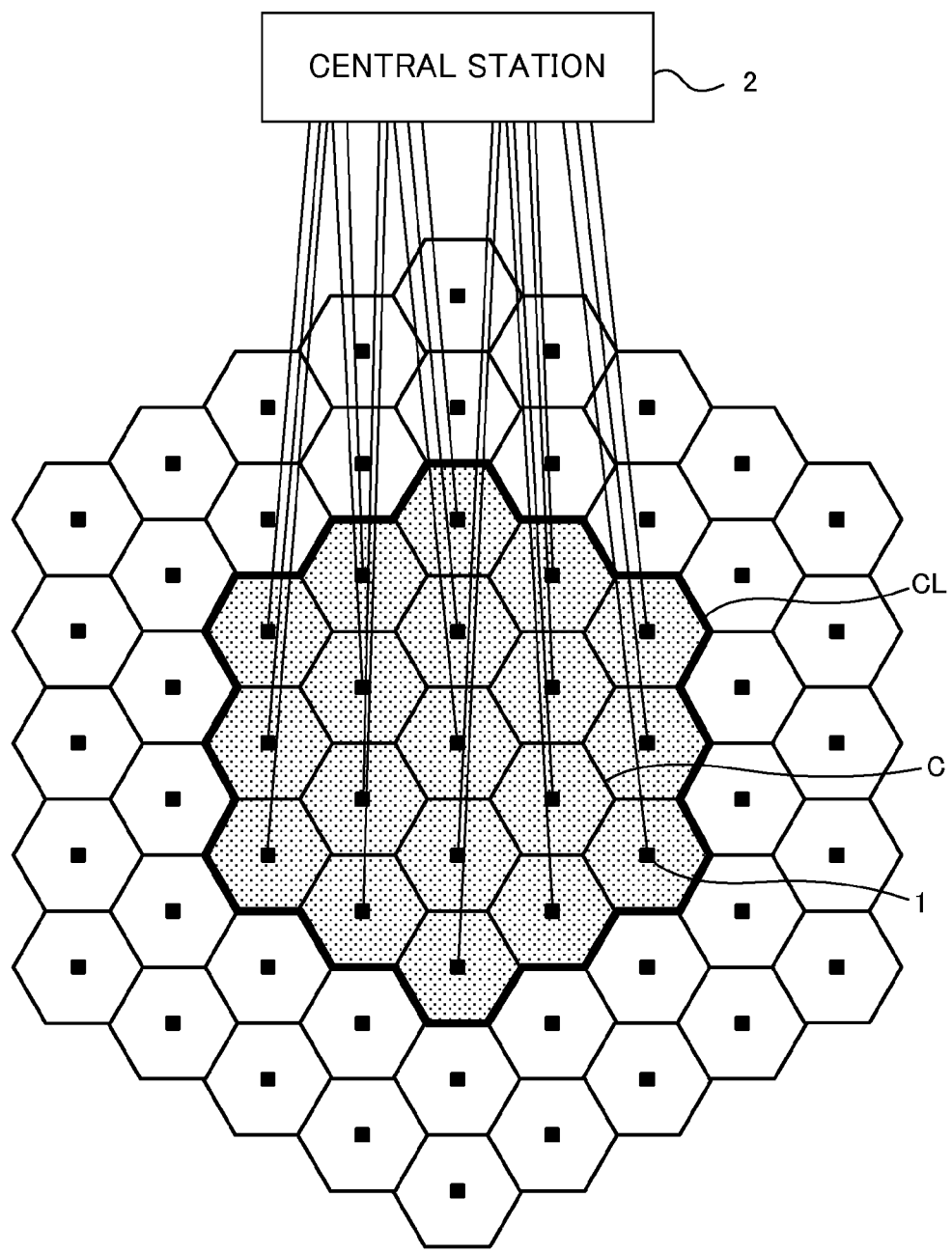
FIG. 1 is a diagram to explain a conventional coordinated transmission system.
Figure 2:
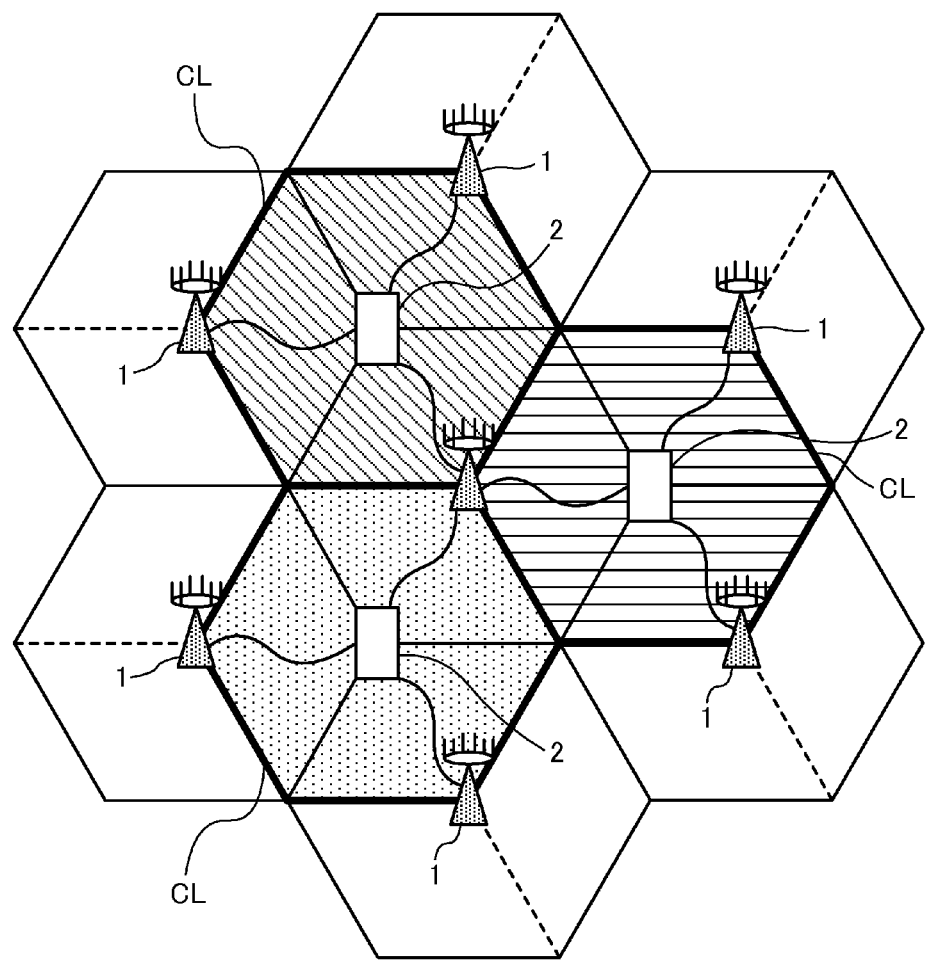
FIG. 2 is a diagram to explain another conventional coordinated transmission system.
Figure 3:
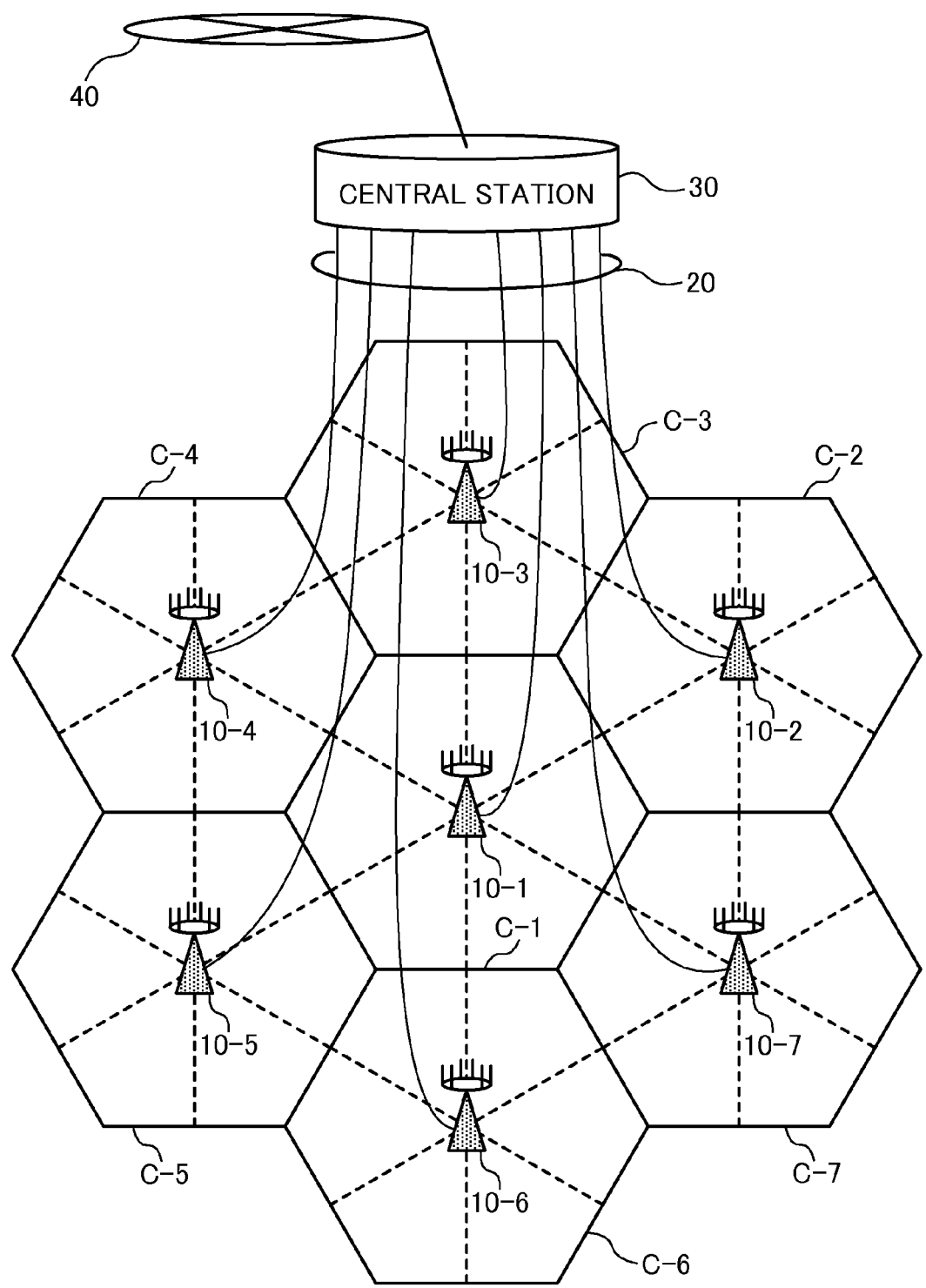
FIG. 3 is a schematic configuration diagram of a coordinated transmission system according to Embodiment 1 of the invention.

FIG. 3 is a schematic configuration diagram of a coordinated transmission system according to Embodiment 1 of the invention. As shown in FIG. 3, the coordinated transmission system is comprised of a plurality of radio base stations 10-1 to 10-7, central station 30 connected to the plurality of radio base stations 10-1 to 10-7 by optical fibers 20, and network 40 connected to the central station 30. The plurality of radio base stations 10-1 to 10-7 respectively form hexagonal cells C-1 to C-7. The hexagonal cells C-1 to C-7 are service areas of the plurality of radio base stations 10-1 to 10-7, respectively. Each of the cells C-1 to C-7 is divided into six sectors.

Figure 4A:
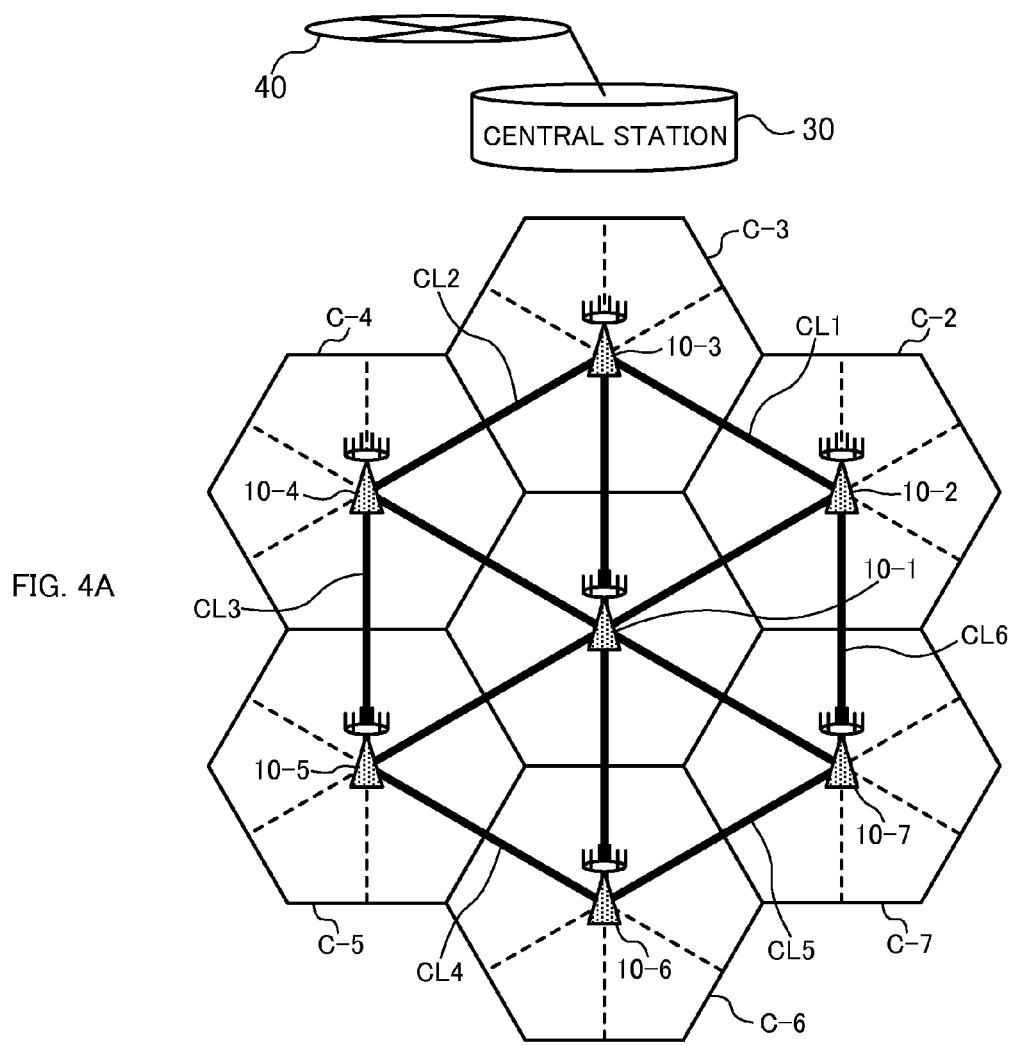
FIG. 4A is a diagram illustrating coordinated clusters formed in the coordinated transmission system according to Embodiment 1 of the invention.
Figure 4B:
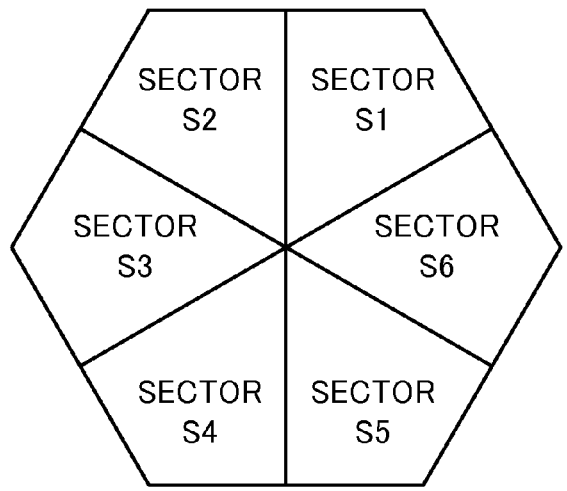
FIG. 4B is a diagram illustrating coordinated clusters formed in the coordinated transmission system according to Embodiment 1 of the invention.

In this coordinated transmission system, a plurality of radio base stations 10 simultaneously transmit (coordinate-transmits) signals to a radio terminal 50 (not shown in the figure) locating in an area (coordinated cluster) formed by adjacent sectors of the plurality of radio base stations 10. FIGS. 4A and 4B are diagrams illustrating coordinated clusters formed in the coordinated transmission system according to Embodiment 1 of the invention. As shown in FIG. 4B, it is assumed that each of the cells C-1 to C-7 is divided into six sectors S1 to S6. In this case, as shown in FIG. 4A, a coordinated cluster CL1 is formed by adjacent sectors S1, S3 and S5 of three radio base stations 10-1, 10-2 and 10-3.

In the coordinated cluster CL1, by multiuser MIMO transmission, radio base stations 10-1, 10-2 and 10-3 simultaneously transmit signals to the radio terminal 50 locating in the coordinated cluster CL1. When the BD-ZF method is used as a precoding method of the multiuser MIMO transmission, since the space of the coordinated cluster CL 1 can be orthogonalized, it is possible to avoid interference among the radio base stations 10 that perform coordinated transmission in the coordinated cluster CL1. Similarly, coordinated clusters CL2 to CL6 are formed, and coordinated transmission is performed in each of the coordinated clusters CL.

Figure 5A:
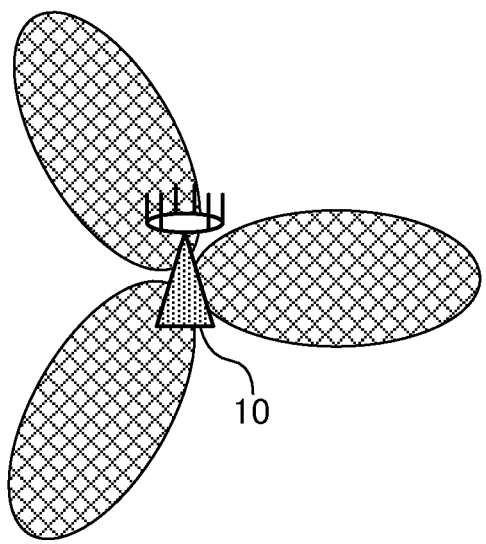
FIG. 5A is a diagram illustrating a directional pattern according to Embodiment 1 of the invention.
Figure 5B:
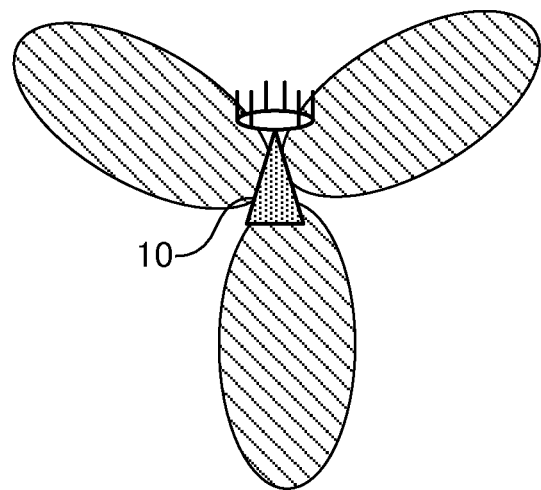
FIG. 5B is a diagram illustrating a directional pattern according to Embodiment 1 of the invention.

Further, in the coordinated transmission system, a directional pattern corresponding to the coordinated cluster CL in which the radio terminal 50 locates is selected from among a plurality of directional pattern. FIG. 5 is a diagram showing directional patterns used in the coordinated transmission system. Herein, the directional pattern shows a combination of a plurality of directional beams transmitted in same frequency domain resources from each radio base station 10. For example, directional pattern 1 of FIG. 5A is formed by three directional beams respectively having peaks in the directions of 0 degree, 120 degrees and 240 degrees when the horizontal direction is assumed to be 0 degree. Meanwhile, directional pattern 2 of FIG. 5B is formed by three directional beams respectively having peaks in the directions of 30 degree, 150 degrees and 270 degrees. In addition, the directional beams constituting the directional pattern may be formed by a plurality of sector antennas provided in each radio base station 10, or may be formed by weights added to an array antenna provided in each radio base station 10.

Figure 6:
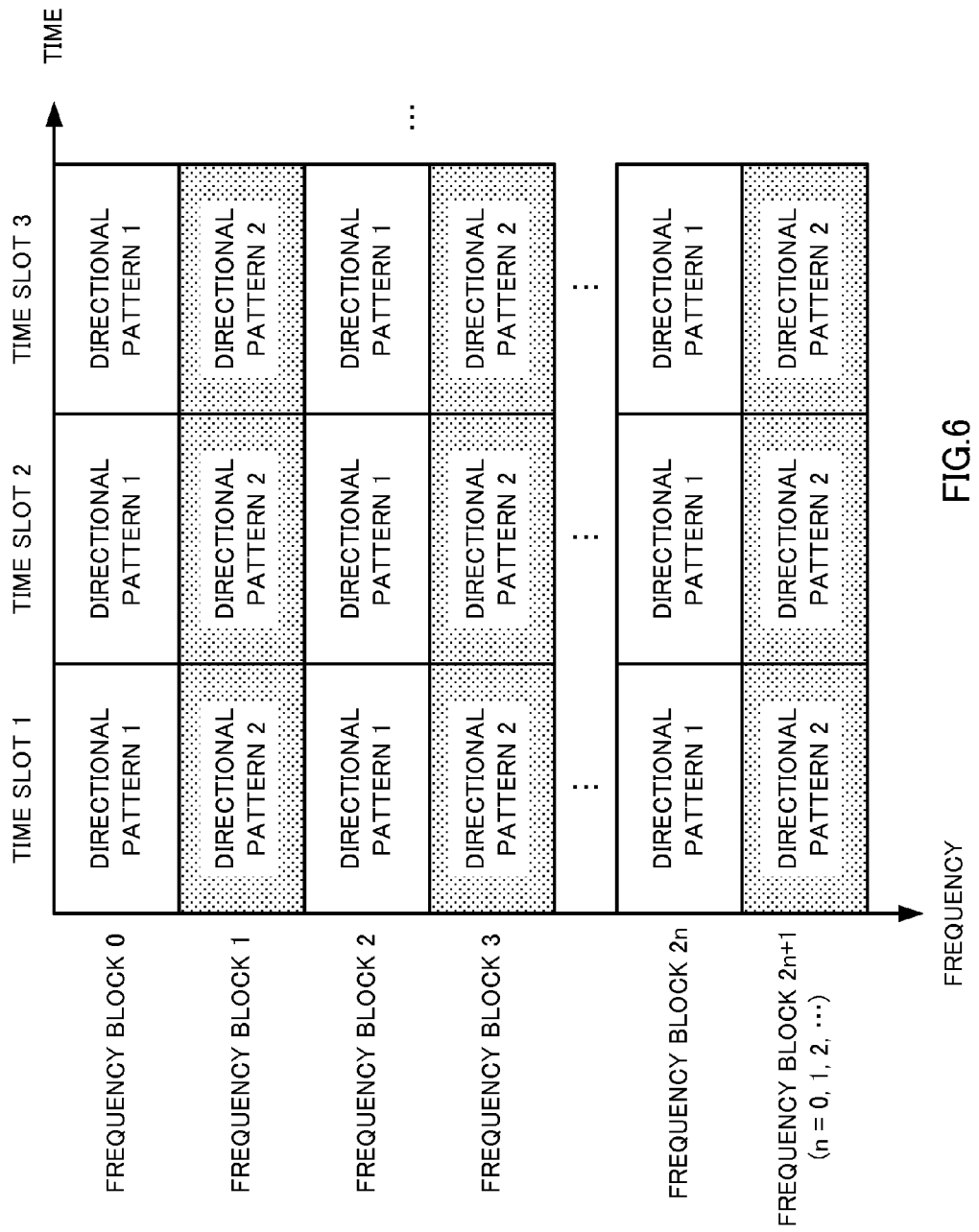
FIG. 6 is a diagram illustrating directional pattern selection information according to Embodiment 1 of the invention.

A plurality of directional patterns are determined respectively corresponding to a plurality of resources in frequency domains. More specifically, the central station 30 assigns directional patterns determined for resources in respective frequency domains to all of the plurality of radio base stations 10 that performs coordinated transmission. FIG. 6 is a diagram showing an example of directional pattern selection information by the central station 30. Herein, the directional pattern selection information is information indicating directional patterns determined for resource units each of which is formed by a single frequency domain and a single time domain. In Embodiment 1, it is assumed that the OFDMA system is used as a communication system, the directional pattern 1 and directional pattern 2 are alternately determined for each frequency block (resource in frequency domain), and that the directional pattern is not changed in the time slots (resources in time domains), as shown in FIG. 6.

Figure 7B:
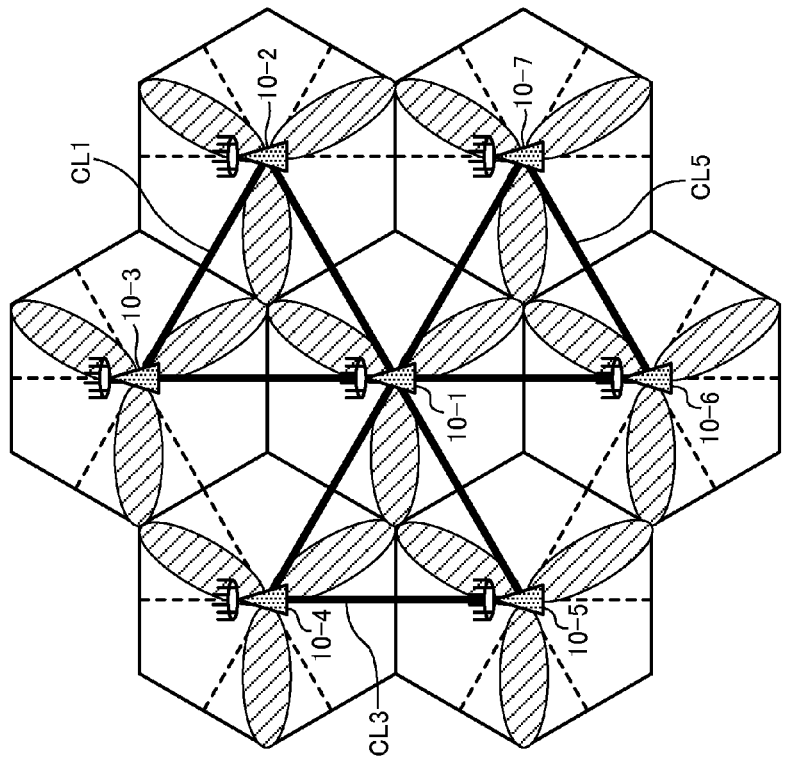
FIG. 7B is a diagram illustrating a state where directional patterns are assigned to all the radio base stations 10 that perform coordinated transmission in Embodiment 1 of the invention.
Figure 7A:
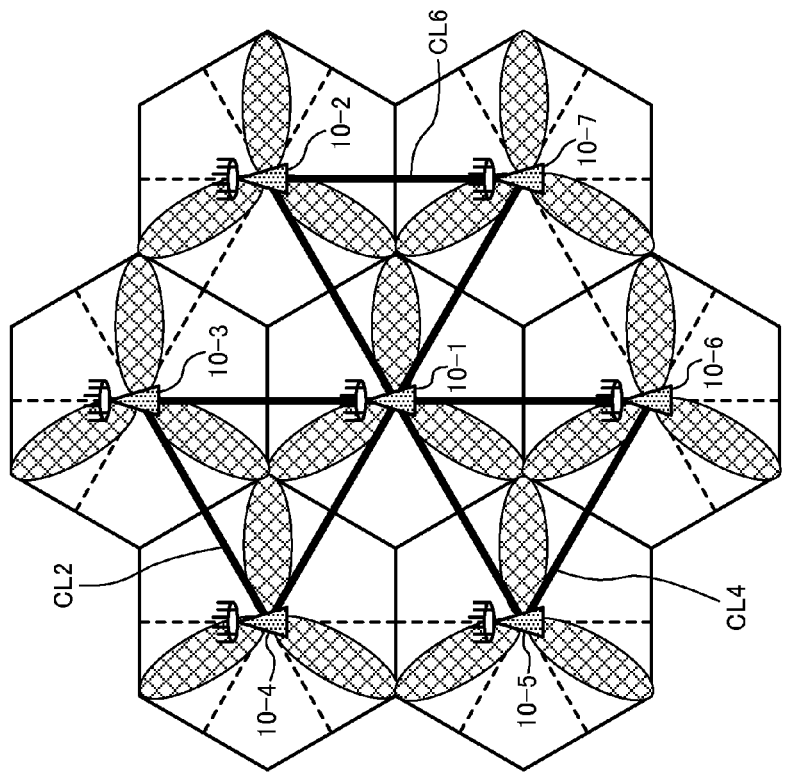
FIG. 7A is a diagram illustrating a state where directional patterns are assigned to all the radio base stations 10 that perform coordinated transmission in Embodiment 1 of the invention.

Further, the directional patterns 1 and 2 are configured so that directional beams of same frequency domain resources, which are transmitted toward the center of the coordinated cluster CL from the plurality of radio base stations 10, are faced one another, while directional beams of the same frequency domain resources as that of the coordinated cluster CL are not transmitted in adjacent areas adjacent to the coordinated cluster CL. FIGS. 7A and 7B are a diagram showing a state where the above-mentioned directional patterns 1 and 2 are assigned to all of the plurality of radio base stations 10 that performs coordinated transmission.

As shown in FIG. 7A, in the case of frequency block number $2n$ ($n≥0$), the directional pattern 1 is assigned to all the radio base stations 10. In this case, when attention is directed to the coordinated cluster CL6 formed by three adjacent sectors of three radio base stations 10-1, 10-2 and 10-7 (i.e. sector S6 of the radio base station 10-1, sector S4 of the radio base station 10-2 and sector S2 of the radio base station 10-7 (see FIG. 4B)), directional beams of the same frequency block, which are transmitted toward the center of the coordinated cluster CL6 from a plurality of radio base stations 10-1, 10-2 and 10-7, are faced one another. Further, in adjacent areas adjacent to the coordinated cluster CL6 (i.e. sectors S1 and S5 of the radio base station 10-1, sectors S3 and S5 of the radio base station 10-2, and sectors S1 and S3 of the radio base station 10-7 (see FIG. 4B)), directional beams of the same frequency block as that in the coordinated cluster CL6 are not transmitted. Such a manner is the same in coordinated clusters CL2 and CL4.

In the case as shown in FIG. 7A, by a plurality of radio base stations 10 performing coordinated transmission with respect to the radio terminal 50 locating inside the coordinated cluster CL, the space inside the coordinated cluster CL can be orthogonalized, and it is possible to prevent the occurrence of interference inside the coordinated cluster CL. Further, since the directional patterns are configured so that directional beams of the same frequency block transmitted toward the center of the coordinated cluster CL from the plurality of radio base stations 10 are faced one another, even the radio terminal 50 located in the center portion of the coordinated cluster CL is capable of receiving the directional beams from three radio base stations with efficiency, and it is possible to prevent the signal quality from deteriorating in the radio terminal 50 located at the center of the coordinated cluster CL. Furthermore, since the directional patterns are configured so that directional beams of the same frequency block as that in the coordinated cluster CL 6 are not transmitted in the adjacent areas adjacent to the coordinated cluster CL, it is possible to prevent interference from the outside of the coordinated cluster CL.

Meanwhile, as shown in FIG. 7B, in the case of frequency block number $2n+1$ ($n≥0$), the directional pattern 2 is assigned to all the radio base stations 10. In this case, coordinated clusters CL1, CL3 and CL5 are formed by sectors where the directional beams are not transmitted in the case of frequency block number $2n$ ($n≥0$). Accordingly, it is possible to transmit signals to radio terminals 50 locating in the coordinated clusters CL1, CL3 and CL5 which do not locate in the coordinated clusters CL2, CL4 and CL6 shown in FIG. 7A.

Described hereinbefore is the schematic configuration of the coordinated transmission system according to Embodiment 1. In addition, described above is the example where the coordinated transmission system is a cellular system comprised of seven cells, C-1 to C-7, but the invention is applicable to cellular systems comprised of two or more cells. Similarly, described above is the example in the case that the number of radio base stations 10 connected to the central station 30 is "7", but the number of radio base stations 10 connected to the central station 30 is variable corresponding to the number of radio base stations 10 that perform coordinated transmission. Further, also the number of sectors per cell is not limited to six, and can be one or more. Furthermore, the number of sectors forming the coordinated cluster CL is not limited to three, and can be two or more. Still furthermore, the number of directional beams constituting the directional pattern is not limited to three, and can be two or more.

Figure 8A:
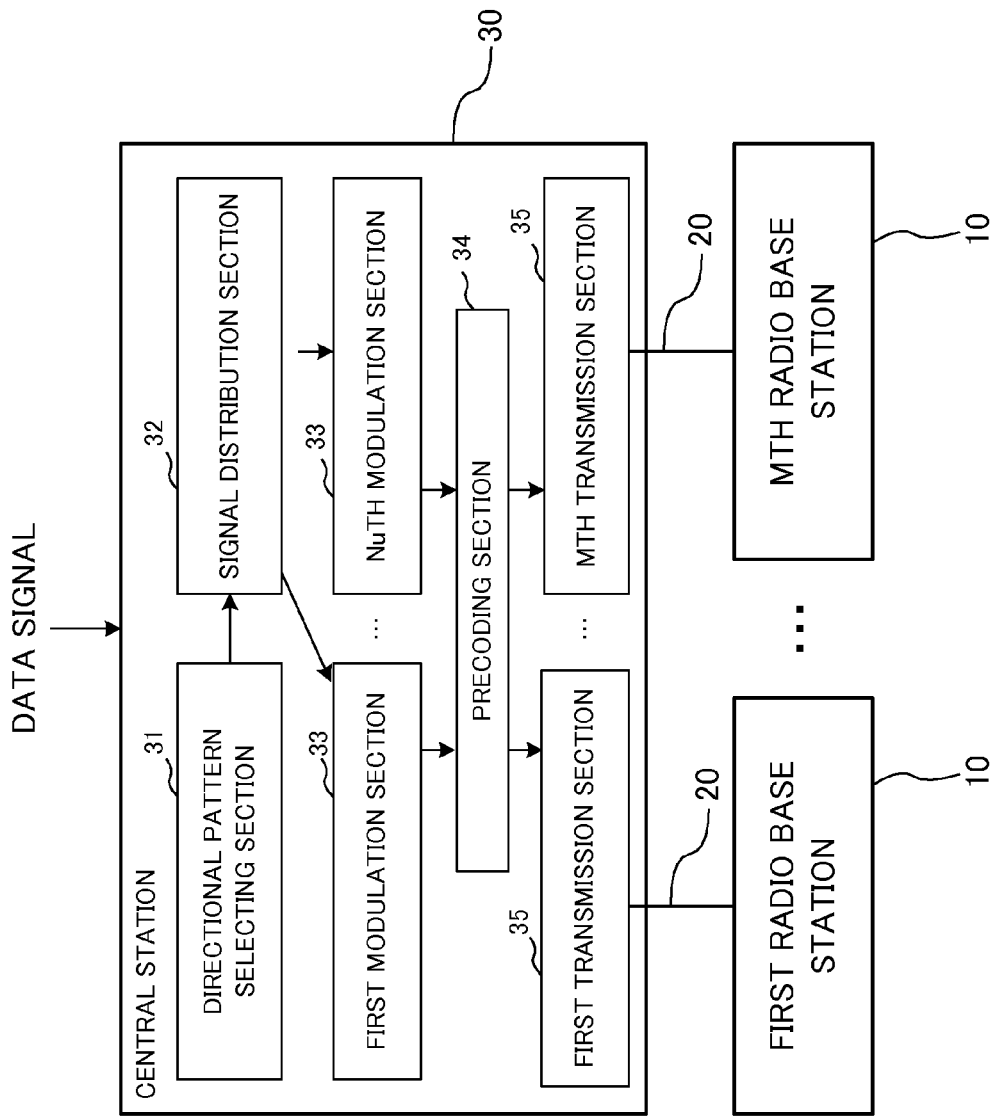
FIG. 8A is a schematic function block diagram of a central station and radio base stations according to Embodiment 1 of the invention.
Figure 8B:
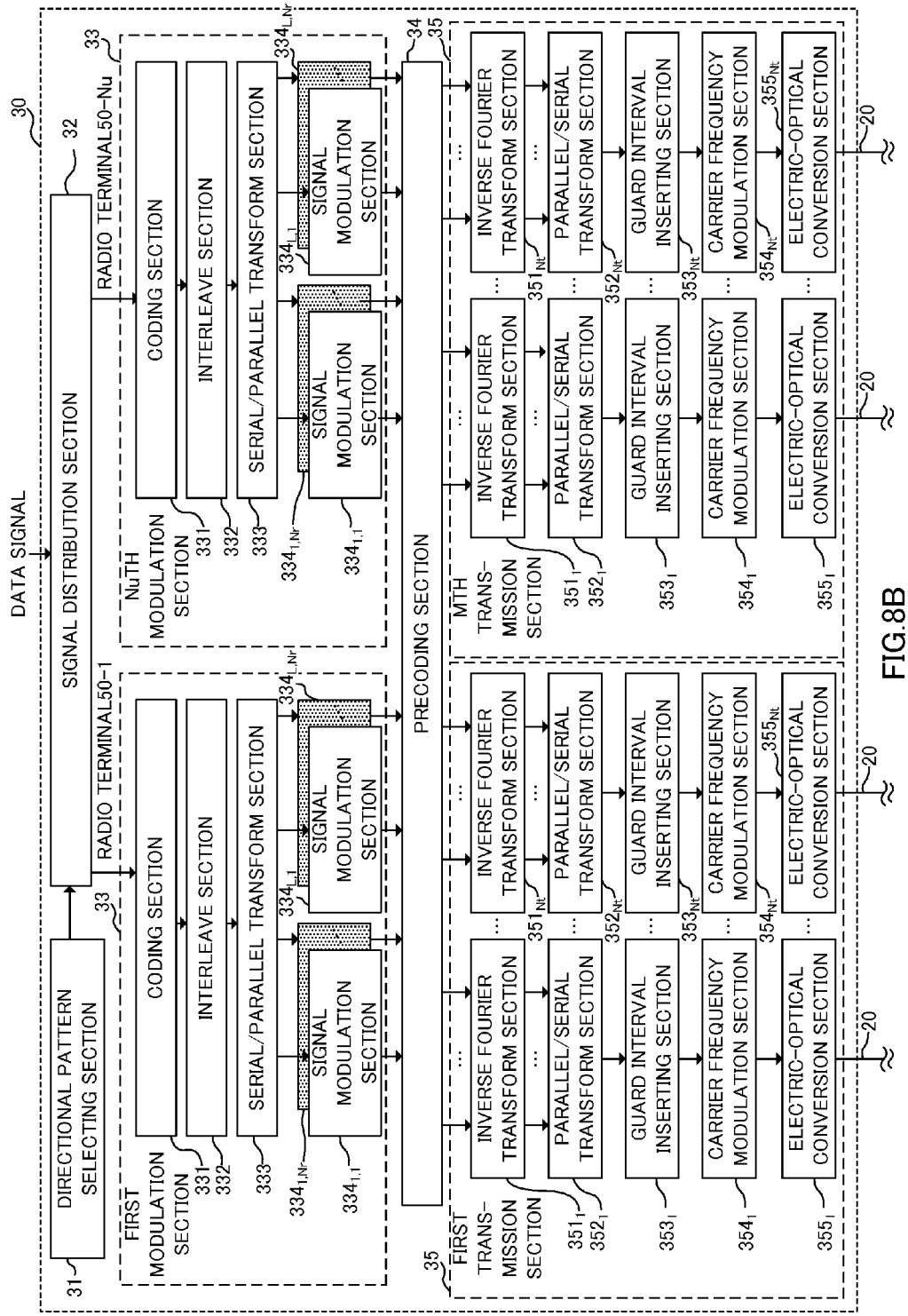
FIG. 8B is a detailed function block diagram of the central station according to Embodiment 1 of the invention.
Figure 8C:
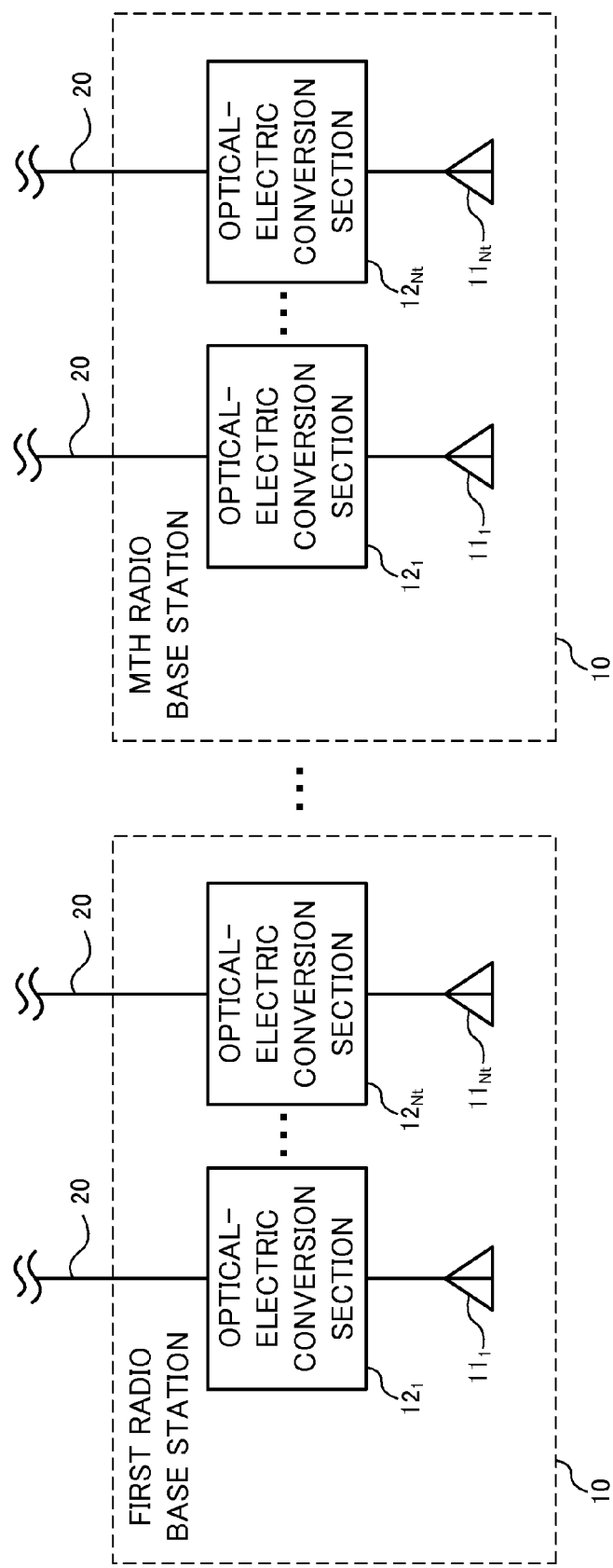
FIG. 8C is a detailed function block diagram of the radio base stations according to Embodiment 1 of the invention.

Described next are functional configurations of the central station 30 and each radio base station 10 constituting the coordinated transmission system according to Embodiment 1. FIG. 8A is a schematic function block diagram of the central station 30 and each radio base station 10, FIG. 8B is a detailed function block diagram of the central station 30, and FIG. 8C is a detailed function block diagram of each radio base station. In this Embodiment, as an example, it is assumed that the number of radio base stations 10 which perform coordinated transmission is M, the number of antenna elements 11 of each radio base station 10 is Nt, and that the number of radio terminals 50 is Nu.

As shown in FIGS. 8A and 8B, the central station 30 includes a directional pattern selecting section 31, signal distribution section 32, Nu modulation sections 33 where Nu is the number of radio terminals to transmit at the same timing, precoding section 34, and M transmission sections 35 where M is the number of radio base stations that perform coordinated transmission.

The directional pattern selecting section 31 holds a plurality of directional patterns configured so that a plurality of radio base stations 10 surrounding a coordinated cluster CL transmits directional beams of same frequency domain resources to face one another with respect to the coordinated cluster CL, while the directional beams of the same frequency domain resources as that in the coordinated cluster CL are not transmitted to adjacent areas adjacent to the coordinated cluster CL. More specifically, the direction pattern selecting section 31 holds the directional pattern selection information indicating directional patterns selected for each frequency block as shown in FIG. 6 to input to the signal distribution section 32.

The signal distribution section 32 receives data signals to all the radio terminals 50-1 to 50-Nu connected to all the radio base stations 10 under the control of the central station 30 from a network 40. The signal distribution section 32 selects a directional pattern corresponding to the coordinated cluster CL in which the radio terminal 50 locates from a plurality of directional patterns, by using the directional pattern selection information input from the direction pattern selecting section 31. According to the selected directional pattern, the signal distribution section 32 distributes the data signals received from the network 40 to the radio terminals 50-1 to 50-Nu. The signal distribution section 32 inputs the data signal distributed for each of Nu radio terminals to first modulation section 33 to Nuth modulation section 33, respectively.

The modulation section 33 includes a coding section 331, interleave section 332, serial/parallel transform section 333, and signal modulation sections 334 for each of the number L of the subcarriers and the number Nr of transmission streams (i.e. number-of-subcarrier L×number-of-transmission-stream Nr signal modulation sections 334).

The coding section 331 performs coding for the data input from the signal distribution section 32 using a predetermined coding method. Herein, as the coding method, turbo code may be used, convolutional code may be user, or LDPC code may be used, and the invention is feasible irrespective of the coding method. The coding section 331 inputs the coded data signal to the interleave section 332.

The interleave section 332 performs interleaving for the data signal input from the coding section 331. Herein, as the interleaving method, any method can be used, and the invention is feasible irrespective of the interleaving method. The interleave section 332 inputs the interleaved data signal to the serial/parallel transform section 333.

The serial/parallel transform section 333 transforms the data signal sequence input from the interleave section 332 into parallel data signals corresponding to the number L of subcarriers and the number Nr of transmission streams. The serial/parallel transform section 333 inputs the data signals for each of the number L of the subcarriers and the number Nr of transmission streams to the signal modulation sections 334 provided for each of the number L of the subcarriers and the number Nr of transmission streams.

Each of the signal modulation sections 334 performs multilevel modulation on the data signal input from the serial/parallel transform section 333. Herein, the modulation level may be fixed, or may be varied adaptively in accordance with conditions of the channel. Each of the signal modulation sections 334 inputs multilevel-modulated data signal to the precoding section 34.

The precoding section 34 performs precoding for the data signal input from each of the signal modulation sections 334 of Nu (the number of radio terminals) modulation sections 33. The precoding section 34 multiplies a transmission weight for precoding by the BD-ZF method by the input data signal, and generates data signals corresponding to the total number of antenna elements Nt of M radio base stations 10 under the control of the central station 30 (i.e. data signals corresponding to the number M of the radio base stations×the number Nt of the antenna elements of each radio base station 10). The precoding section 34 inputs generated M×Nt data signals to the first transmission section 35 to Mth transmission section 35 provided for each of M radio base stations 10.

Each of the transmission sections 35 includes inverse Fourier transform sections 351, parallel/serial transform sections 352, guard interval inserting sections 353, carrier frequency modulation sections 354 and electric-optical conversion sections 355, for each of the number Nt of antenna elements of each radio base station 10.

The inverse Fourier transform sections 351 transform the data signals input from the precoding section 34 from the frequency domain to the time domain. The inverse Fourier transform sections 351 input the data signals transformed into the time domain to the parallel/serial transform sections 352.

The parallel/serial transform sections 352 transform data signal sequences corresponding to the number L of subcarriers and the number Nt of antenna elements into serial data signal sequences corresponding to the number Nt of antenna elements. The parallel/serial transform sections 352 input the data signal sequences for each of the number Nt of antenna elements to guard interval inserting sections 353 provided for each of the number Nt of antenna elements.

The guard interval inserting sections 353 insert guard intervals in the data signal sequences input from the parallel/serial transform sections 352, and input the data signal sequences with the guard intervals inserted therein to the carrier frequency modulation sections 354.

The carrier frequency modulation sections 354 modulate the data signal sequences input from the guard interval inserting sections 353 into the carrier frequency, and input the modulated data signals to the electric-optical conversion sections 355.

The electric-optical conversion sections 355 modulate the data signals input from the carrier frequency modulation sections 354 from electric signals to optical signals, and input the modulated data signals to the radio base station via the optical fibers 20.

As shown in FIG. 8C, each of radio base stations 10 connected to the central station 30 via the optical fibers 20 includes Nt antenna elements 11, and Nt optical-electric conversion sections 12 respectively connected to the Nt antenna elements 11.

The optical-electric conversion section 12 demodulates the data signal input from the central station 30 via the optical fiber 20 from the optical signal to an electric signal, and inputs the demodulated data signal to the antenna element 11. The data signal input to the antenna element 11 is radiated into space.

Figure 9:
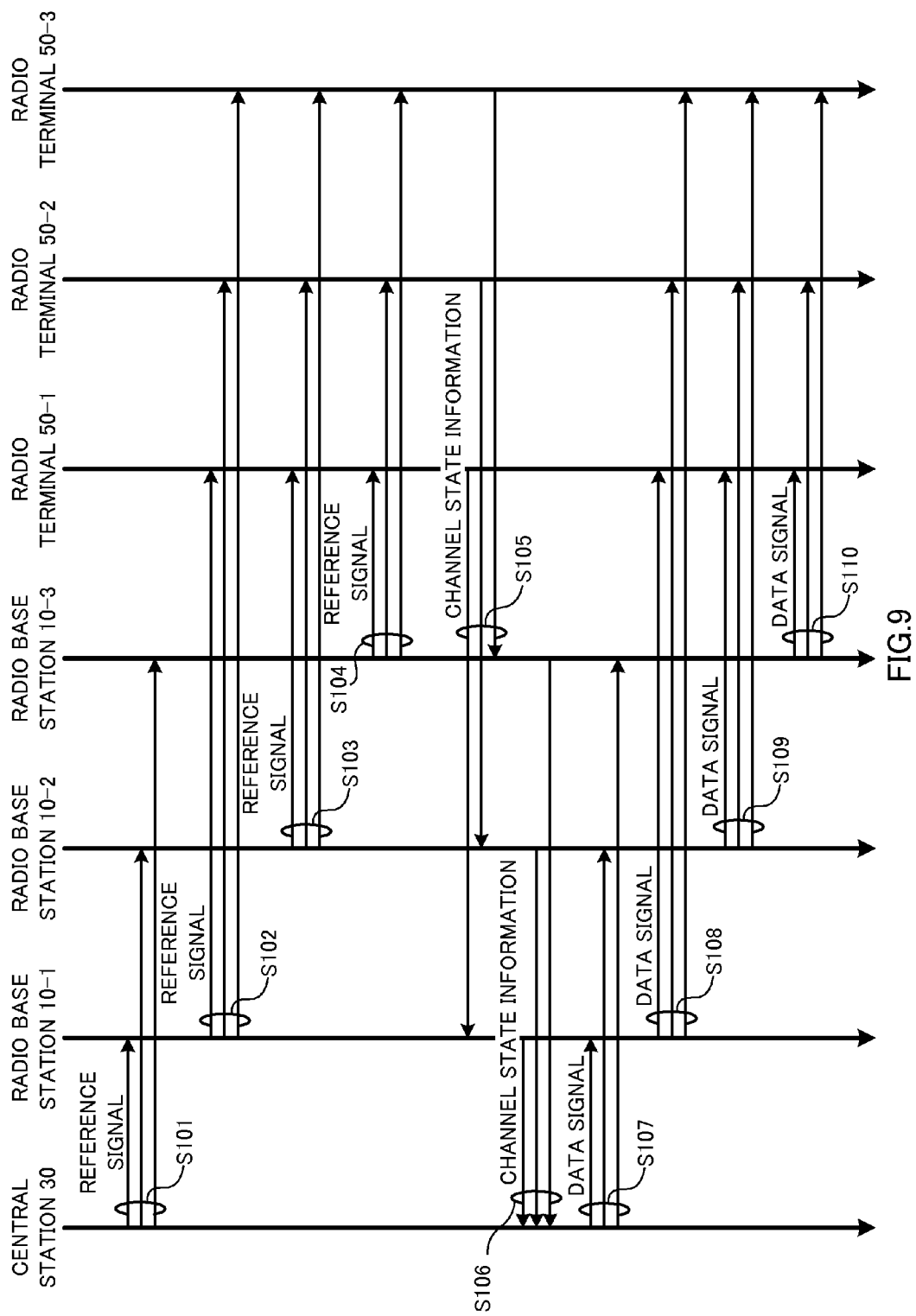
FIG. 9 is a sequence diagram illustrating a coordinated transmission method according to Embodiment 1 of the invention.

Described next is a coordinated transmission method in the coordinated transmission system configured as described above. FIG. 9 is a sequence diagram illustrating the coordinated transmission method according to Embodiment 1. Herein, in the sequence diagram, it is assumed that a coordinated cluster CL (for example, the coordinated cluster CL1 in FIG. 7B) is formed by adjacent sectors of the radio base stations 10-1 to 10-3. Further, it is assumed that the radio base stations 10-1 to 10-3 transmit signals to radio terminals 50-1 to 50-3 locating in the coordinated cluster CL1, by using the frequency domain (for example, frequency block of frequency block number $2n+1$ in FIG. 7B) which applies to the directional pattern 2 forming the coordinated cluster CL1.

The central station 30 transmits a reference signal for channel estimation to the radio base stations 10-1 to 10-3 (step S101). The radio base station 10-1 transmits the reference signal from the central station 30 to all the radio terminals 50-1 to 50-3 (i.e. radio terminals 50 locating in the coordinated cluster CL1) connected to the radio base station 10-1 (step S102). Similarly, the radio base stations 10-2 and 10-3 transmit the reference signals from the central station 30 to all the radio terminals 50-1 to 50-3 connected to the radio base stations 10-2 and 10-3 (steps S103, S104).

In addition, the reference signals transmitted from the radio base stations 10-1 to 10-3 to the radio terminals 50-1 to 50-3 in steps S102 to S104 are transmitted according to the directional pattern 2 forming the coordinated cluster CL (herein, the coordinated cluster CL 1 is assumed) in which the radio terminals 50-1 to 50-3 locate.

The radio terminals 50-1 to 50-3 perform channel estimation using the reference signals received from the radio base stations 10-1 to 10-3, and transmit channel state information that is channel estimation results to the radio base stations 10-1 to 10-3 (step S105). Herein, as the channel state information, the radio terminals 50-1 to 50-3 may transmit channel estimation results of all the frequency domains, or to prevent congestion on the uplink, may transmit channel estimation results of part of the frequency domains.

The radio base stations 10-1 to 10-3 transmit the channel state information received from the radio terminals 50-1 to 50-3 to the central station 30 (step S106). Based on the channel state information received from the radio base stations 10-1 to 10-3, the central station 30 performs the multiuser MIMO transmission processing for performing precoding by the BD-ZF method, and transmits the precoded data signals to the radio terminals 50-1 to 50-3 to the radio base stations 10-1 to 10-3 (step S107).

The radio base station 10-1 transmits the data signals to the radio terminals 50-1 to 50-3 received from the central station 30 respectively to the radio terminals 50-1 to 50-3 (step S108). Similarly, the radio base stations 10-2 and 10-3 transmit the data signals to the radio terminals 50-1 to 50-3 received from the central station 30 respectively to the radio terminals 50-1 to 50-3 (steps S109, S110).

According to the coordinated transmission system according to Embodiment 1, a plurality of directional patterns selected corresponding to the coordinated cluster CL in which the radio terminal locates is configured so that directional beams of same frequency domain resources, which are transmitted from a plurality of radio base stations to the coordinated cluster CL, are faced one another. As a result, it is possible to orthogonalize the space inside the coordinated cluster by coordinated transmission, interference inside the coordinated cluster CL can be prevented from occurring, and further, it is possible to prevent the signal quality from deteriorating in the radio terminal located at the center of the coordinated cluster CL. Furthermore, the directional patterns are configured so that directional beams of the same frequency domain resources as that in the coordinated cluster CL are not transmitted in adjacent areas adjacent to the coordinated cluster CL, and it is thereby possible to prevent interference from outside the coordinated cluster CL.

Moreover, by assigning different directional patterns for resources in respective frequency domains, it is possible to form the coordinated cluster, which is not formed in some frequency domain, in the other frequency domain, and it is thereby possible to transmit signals to radio terminals 50 locating in any coordinated clusters.

Embodiment 2

A coordinated transmission system according to Embodiment 2 will be described below, focusing on differences from Embodiment 1. In Embodiment 1, a plurality of directional patterns are determined respectively corresponding to a plurality of resources in frequency domains, and in Embodiment 2, a plurality of directional patterns is determined respectively corresponding to a plurality of resources in time domains, in addition to a plurality of resources in frequency domains. Further, in Embodiment 2, directional patterns are determined respectively corresponding to a plurality of resources in time domains, in accordance with traffic conditions of the coordinated cluster CL in which the radio terminal 50 locates.

Figure 10:
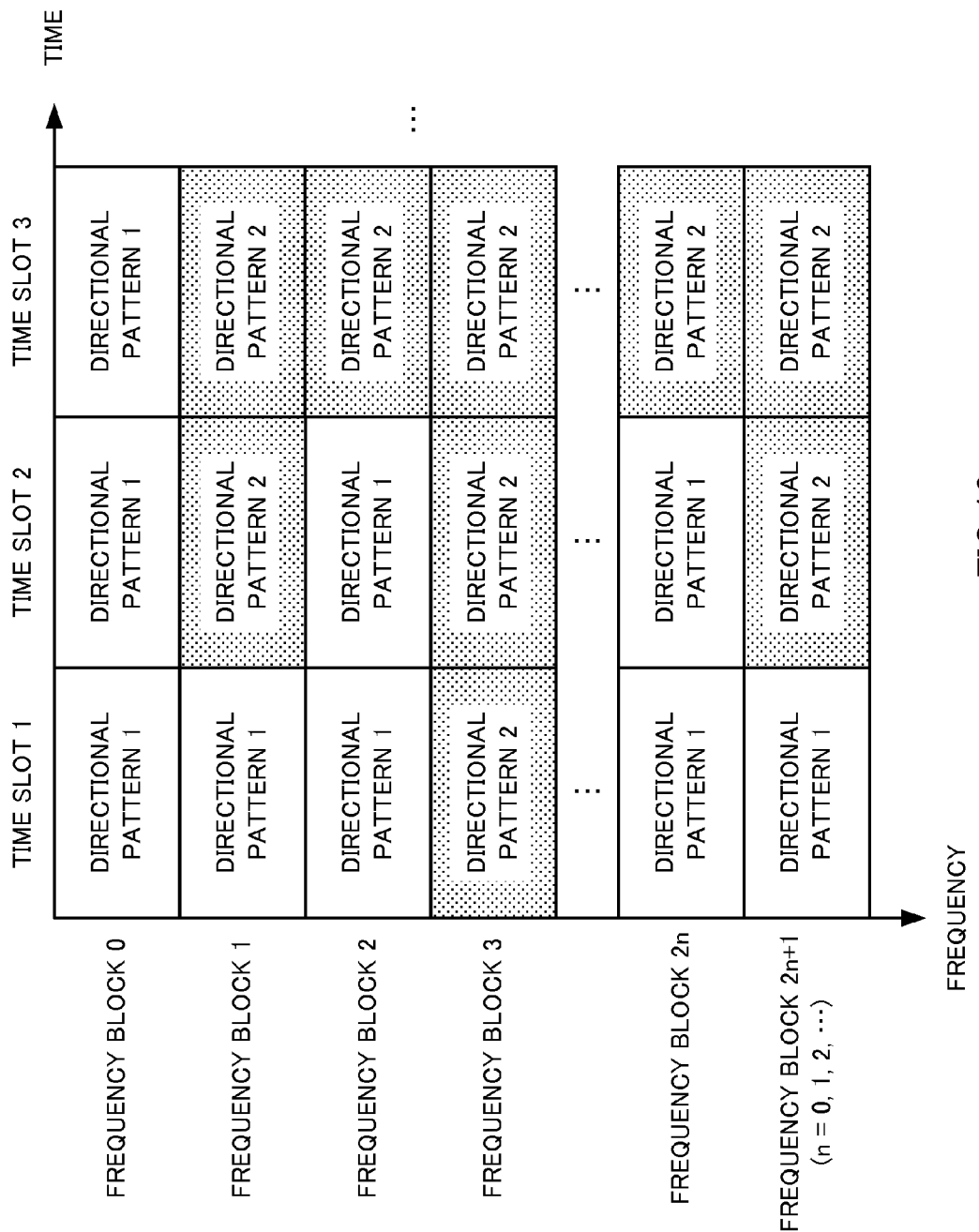
FIG. 10 is a diagram illustrating directional pattern selection information according to Embodiment 2 of the invention.

FIG. 10 is a diagram showing an example of directional pattern selection information according to Embodiment 2. In Embodiment 2, it is assumed that the OFDMA system is used as a communication system, and as shown in FIG. 10, in addition to a frequency-block (resource in frequency domain) basis, directional patterns are determined also in time slots (resources in time domains).

More specifically, in FIG. 10, first, the directional pattern 1 and directional pattern 2 are alternately determined for each frequency block. Then, when the traffic amount in a coordinated cluster CL (for example, coordinated clusters CL2, CL4, CL6 in FIG. 7A) covered by the direction pattern 1 is larger than the traffic amount in another coordinated cluster CL (for example, coordinated clusters CL1, CL3, CL5 in FIG. 7B) covered by the directional pattern 2, the selection amount of the directional pattern 1 is increased. For example, the directional pattern 2 is first determined for the frequency block 1 in FIG. 10, and as the traffic amount increases in the coordinated cluster CL covered by the directional pattern 1, the directional pattern 1 is determined for the time slot 1 of the frequency block 1, instead of the directional pattern 2.

Further, to follow the time variation in the traffic amount, when the traffic amount increases in the coordinated cluster CL covered by the directional pattern 2 in the time slot 2 of the frequency block 1, the selection amount of the directional pattern 2 is increased. For example, the directional pattern 1 is first determined for the frequency block 2 in FIG. 10, and as the traffic amount increases in the coordinated cluster CL covered by the directional pattern 2, the directional pattern 2 is determined for the time slot 3 of the frequency block 2, instead of the directional pattern 1.

Figure 11:
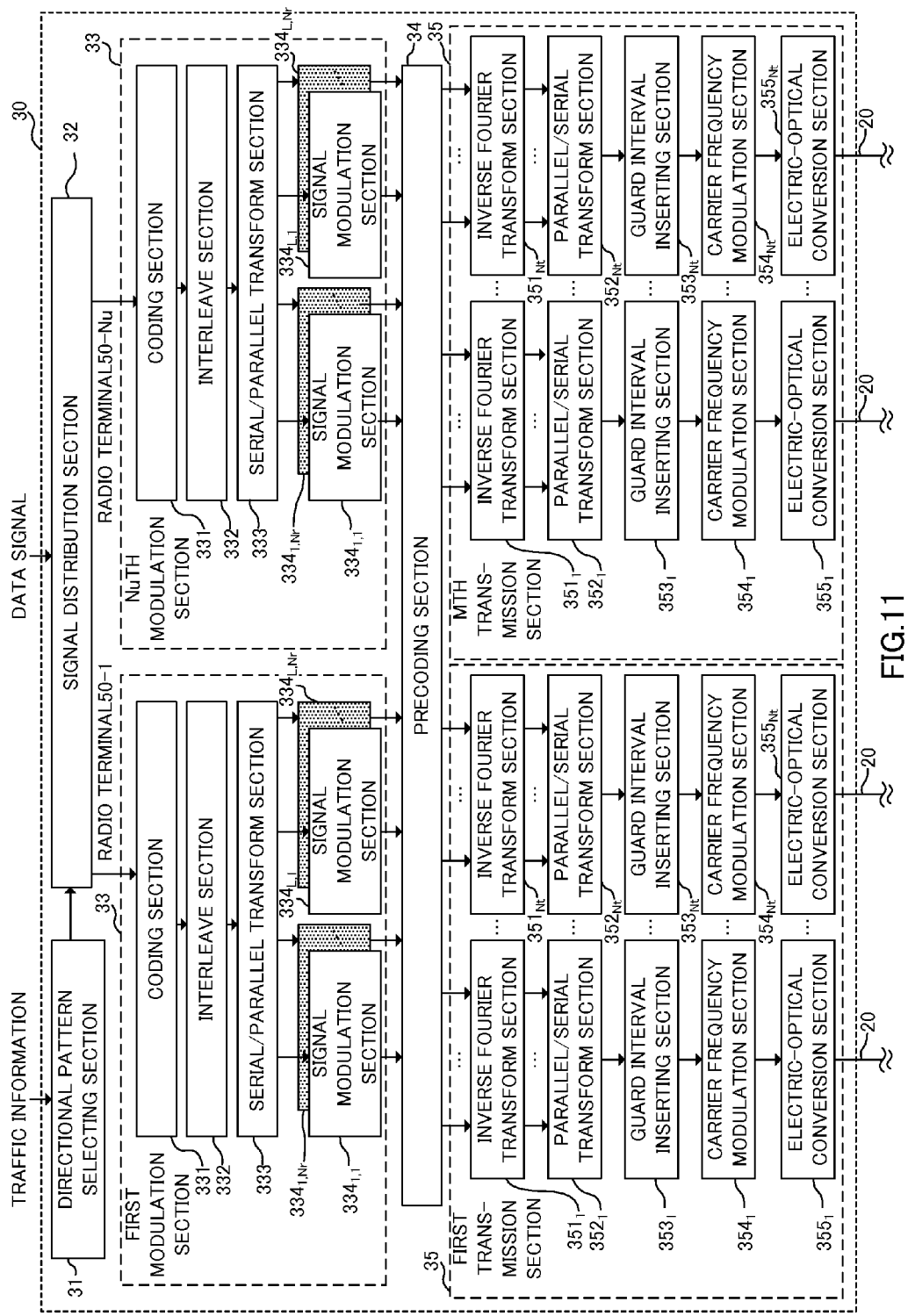
FIG. 11 is a detailed function block diagram of a central station according to Embodiment 2 of the invention.

FIG. 11 is a detailed function block diagram of the central station 30 according to Embodiment 2. As shown in FIG. 11, the central station 30 according to Embodiment 2 differs from that in Embodiment 1 in the respect that traffic information input from the network 40 is input to the directional pattern selecting section 31.

The directional pattern selecting section 31 selects directional patterns configured so that beams transmitted using same frequency domain resources from each of a plurality of radio base stations 10 toward the coordinated cluster CL are faced one another, and that beams are not transmitted in the same frequency domain resources as that in the coordinated cluster in adjacent areas adjacent to the coordinated cluster CL, for each frequency block (resources in frequency domain) and for each time slot (resources in time domain).

More specifically, as described with reference to FIG. 10, the directional pattern selecting section 31 selects directional patterns for each frequency block and for each time slot, based on the traffic amount in the coordinated cluster covered by each directional pattern input from the network 40. The directional pattern selecting section 31 holds directional pattern selection information indicating directional patterns selected for each frequency block and for each time slot as shown in FIG. 10, and inputs the information to the signal distribution section 32.

Using the directional pattern selection information input from the directional pattern selecting section 31, the signal distribution section 32 selects the directional pattern corresponding to the coordinated cluster CL in which the radio terminals 50 locate from among a plurality of directional patterns. According to the selected directional pattern, the signal distribution section 32 distributes data signals received from the network 40 to the radio terminals 50-1 to 50-Nu. The other functional configuration is the same as in Embodiment 1.

According to the coordinated transmission system according to Embodiment 2, different directional patterns are determined for resources in respective frequency domains and respective time domains based on the traffic amount in the coordinated cluster covered by each directional pattern, and it is thereby made possible to improve throughput in the coordinated transmission system.

A coordinated transmission system according to a modification will be described below, focusing on differences from Embodiments 1 and 2. In Embodiments 1 and 2, the example is described where a plurality of radio base stations 10 that performs coordinated transmission is connected to the central station 30 (see FIG. 8A), and the central station 30 selects the directional pattern corresponding to the coordinated cluster CL in which the radio terminal 50 locates. The modification describes an example where the central station 30 is not provided, a plurality of radio base stations 10 share the directional pattern selection information, and each of the radio base stations 10 selects a directional pattern corresponding to the coordinated cluster CL in which the radio terminal 50 locates.

Figure 12:
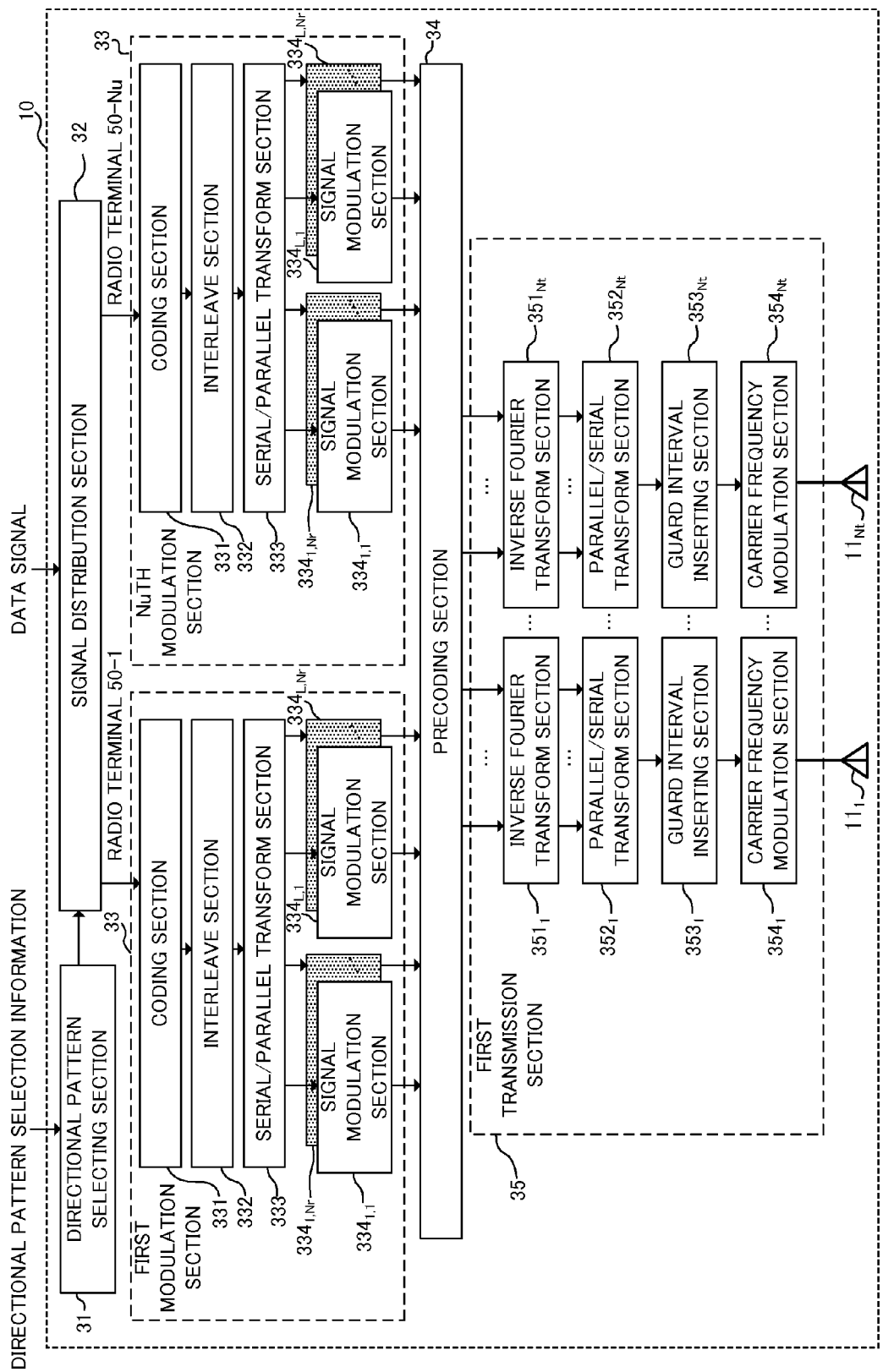
FIG. 12 is a detailed function block diagram of a radio base station according to a modification of the invention.

FIG. 12 is a detailed function block diagram of each radio base station 10 according to the modification. As shown in FIG. 12, each radio base station 10 includes the directional pattern selecting section 31, signal distribution section 32, Nu modulation sections 13 where Nu is the number of radio terminals to transmit at the same timing, precoding section 34 and one transmission section 35, which the central station 30 in Embodiments 1 and 2 includes.

The directional pattern selecting section 31 holds the direction pattern selection information (see FIG. 6 or FIG. 10) as in Embodiment 1 or 2. The directional pattern selecting section 31 shares the directional pattern selection information with the other radio base stations that perform coordinated transmission, and in this respect, differs from that in Embodiment 1 or 2.

The signal distribution section 32 has the same function as in Embodiment 1 or 2, and inputs data signals distributed for each of Nu radio terminals under coordinated transmission respectively to the first modulation section 33 to Nu modulation section 33.

Nu modulation sections 33 input modulated data signals to the precoding section 34, where Nu is the number of radio terminals. The precoding section 34 multiplies a transmission weight for precoding by the BD-ZF method by the data signal input from each of the signal modulation sections 334 of Nu (the number of radio terminals) modulation sections 33, and generates data signals corresponding to the total number Nt of antenna elements of the radio base station 10. The precoding section 34 inputs generated Nt data signals to the transmission section 35.

The transmission section 35 has the same functions as in Embodiment 1 or 2 except the respect that the section 35 does not include electric-optical conversion sections 355. The transmission section 35 inputs data signals modulated to the carrier frequency to the antenna elements 11. The data signals input to the antenna elements 11 are radiated into space.

Figure 13:
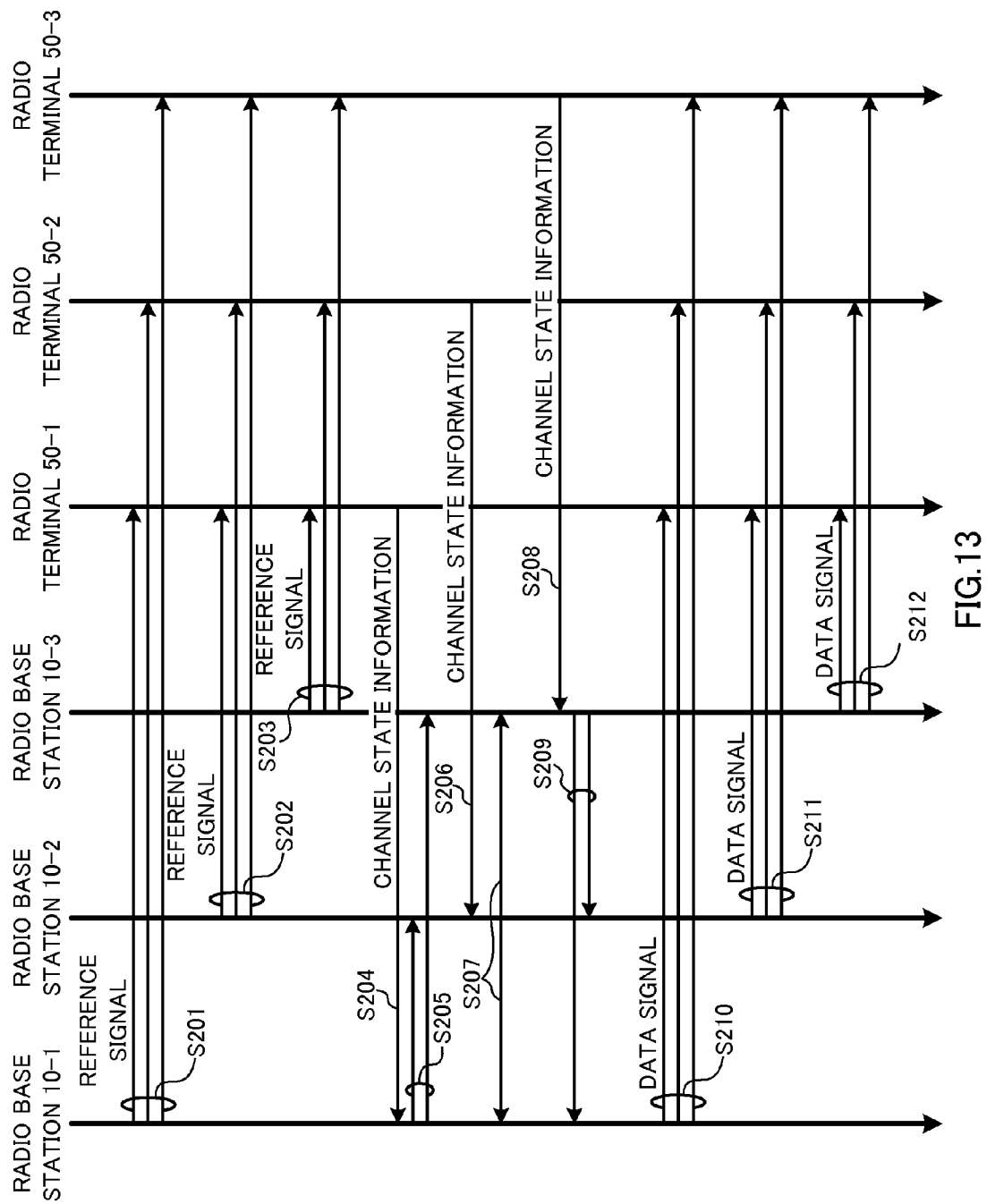
FIG. 13 is a sequence diagram illustrating a coordinated transmission method according to the modification of the invention.

Described next is a coordinated transmission method in the coordinated transmission system configured as described above. FIG. 13 is a sequence diagram illustrating the coordinated transmission method according to the modification. Herein, the sequence diagram differs from the sequence diagram described with reference to FIG. 9 in the respect that the central station 30 is not provided, and that the radio base stations 10-1 to 10-3 are connected to one another. In addition, in the sequence diagram, it is assumed that a coordinated cluster CL (for example, the coordinated cluster CL1 in FIG. 7B) is formed by adjacent sectors of the radio base stations 10-1 to 10-3. Further, it is assumed that the radio base stations 10-1 to 10-3 transmit signals to radio terminals 50-1 to 50-3 locating in the coordinated cluster CL1, using the resource in frequency domain (for example, frequency block of frequency block number 2*n*+1 in FIG. 7B) which applies to the directional pattern 2 forming the coordinated cluster CL1.

As shown in FIG. 13, the radio base station 10-1 transmits a reference signal from the radio base station 10-1 to all the radio terminals 50-1 to 50-3 (i.e. radio terminals 50 locating in the coordinated cluster CL1) connected to the radio base station 10-1 (step S201). Similarly, the radio base stations 10-2 and 10-3 transmit the reference signals respectively from the radio base stations 10 to all the radio terminals 50-1 to 50-3 connected to the radio base stations 10-2 and 10-3 (steps S202, S203).

In addition, the reference signals transmitted from the radio base stations 10-1 to 10-3 to the radio terminals 50-1 to 50-3 in steps S201 to S203 are transmitted according to the directional pattern 2 forming the coordinated cluster CL (herein, the coordinated cluster CL 1 is assumed) in which the radio terminals 50-1 to 50-3 locate.

The radio terminals 50-1 to 50-3 perform channel estimation using the reference signals received from the radio base stations 10-1 to 10-3. The radio terminals 50-1 to 50-3 transmit channel state information that is channel estimation results to one radio base station 10 (for example, the radio base station 10 that provides the highest reception power) among the radio base stations 10-1 to 10-3.

Herein, it is assumed that the radio terminal 50-1 transmits the channel state information to the radio base station 10-1 (step S204). The radio base station 10-1 transmits the received channel state information to the other radio base stations 10-2 and 10-3 that perform coordinated transmission with respect to the radio terminal 50-1 (step S205). Similarly, the channel state information transmitted from the radio terminals 50-2 and 50-3 is shared among the radio base stations 10-1 to 10-3 that perform coordinated transmission with respect to the radio terminals 50-2 and 50-3 (steps S206 to S209).

Based on the received channel state information, each of the radio base stations 10-1 to 10-3 performs the multiuser MIMO transmission processing for performing precoding by the BD-ZF method, and transmits the precoded data signals to the radio terminals 50-1 to 50-3 (steps S210 to S212).

Other Embodiment

In the coordinated transmission systems in the above-mentioned Embodiments, the OFDMA system is used as the communication system, and a single carrier FDMA system and CDMA system may be used as the communication system. When the single carrier FDMA system or CDMA system is used as the communication system, by selecting the directional pattern for each carrier frequency, instead of selecting for each frequency block, the invention is applicable.

Further, in the coordinated transmission methods in the above-mentioned Embodiments, precoding is performed by the BD-ZF method, and precoding may be performed using other methods such as a Zero-Forcing method, non-linear precoding, and MSE (Minimum Mean Square Error).

What is claimed is:

1. A coordinated transmission method in which a plurality of radio base stations simultaneously transmit signals to a radio terminal locating in a first coordinated cluster formed by adjacent sectors of the plurality of radio base stations, comprising:

selecting a first directional pattern or a second directional pattern, wherein the first directional pattern is configured so that the plurality of radio base stations transmit first directional beams of a first frequency domain resource toward a center of the first coordinated cluster while not transmitting the first directional beams toward a second coordinated cluster adjacent to the first coordinated cluster, and the second directional pattern is configured so that the plurality of radio base stations transmit second directional beams of a second frequency domain resource toward a center of the second coordinated cluster while not transmitting the second directional beams toward the first coordinated cluster; and distributing a signal to transmit to the radio terminal according to the selected directional pattern, determining a frequency domain and directions of directional beams regarding the distributed signal, and delivering the signal to each of the plurality of radio base stations that simultaneously transmits the signal to the radio terminal.

2. The coordinated transmission method according to claim 1, wherein the first and second directional patterns are determined respectively corresponding to a plurality of resources in time domains, in addition to the plurality of resources in frequency domains.

3. The coordinated transmission method according to claim 2, wherein the first and second directional patterns are determined respectively corresponding to the plurality of resources in time domains, in accordance with traffic conditions in the first coordinated cluster.

4. The coordinated transmission method according to claim 1, wherein the plurality of resources in frequency domains is a plurality of frequency blocks of an OFDMA system, and the first and second directional patterns are determined respectively corresponding to the plurality of frequency blocks.

5. The coordinated transmission method according to claim 1, wherein the selected signal distributed according to the directional pattern is delivered to each of the plurality of radio base stations that simultaneously transmits the signal to the radio terminal, by using multiuser MIMO transmission for performing precoding by a Block Diagonalization Zero-Forcing method.

6. A coordinated transmission system in which a plurality of radio base stations simultaneously transmit signals to a radio terminal locating in a first coordinated cluster formed by adjacent sectors of the plurality of radio base stations, comprising:
  a selection section for selecting a first directional pattern or a second directional pattern, wherein the first directional pattern is configured so that the plurality of radio base stations transmit first directional beams of a first frequency domain resource toward a center of the first coordinated cluster while not transmitting the first directional beams toward a second coordinated cluster adjacent to the first coordinated cluster, and the second directional pattern is configured so that the plurality of radio base stations transmit second directional beams of a second frequency domain resource toward a center of the second coordinated cluster while not transmitting the second directional beams toward the first coordinated cluster; and
  a delivery section for distributing a signal to transmit to the radio terminal according to the selected directional pattern, determining a frequency domain and directions of directional beams regarding the distributed signal, and delivering the signal to each of the plurality of radio base stations that simultaneously transmits the signal to the radio terminal.

7. A central station connected to a plurality of radio base stations in a coordinated transmission system in which the plurality of radio base stations simultaneously transmit signals to a radio terminal locating in a first coordinated cluster formed by adjacent sectors of the plurality of radio base stations, comprising:
  a selection section for selecting a first directional pattern or a second directional pattern, wherein the first directional pattern is configured so that the plurality of radio base stations transmit first directional beams of a first frequency domain resource toward a center of the first coordinated cluster while not transmitting the first directional beams toward a second coordinated cluster adjacent to the first coordinated cluster, and the second directional pattern is configured so that the plurality of radio base stations transmit second directional beams of a second frequency domain resource toward a center of the second coordinated cluster while not transmitting the second directional beams toward the first coordinated cluster; and
  a delivery section for distributing a signal to transmit to the radio terminal according to the selected directional pattern, determining a frequency domain of and directions of directional beams regarding the distributed signal, and delivering the signal to each of the plurality of radio base stations that simultaneously transmits the signal to the radio terminal.

8. The central station according to claim 7, wherein the first and second directional patterns are determined respectively corresponding to a plurality of resources in time domains, in addition to the plurality of resources in frequency domains.

9. The central station according to claim 8, wherein the first and second directional patterns are determined respectively corresponding to a plurality of resources in time domains, in accordance with traffic conditions.

10. The central station according to claim 7, wherein the plurality of resources in frequency domains is a plurality of frequency blocks of an OFDMA system, and the first and second directional patterns are determined respectively corresponding to the plurality of frequency blocks.

11. The central station according to claim 7, wherein the delivery section delivers the selected signal distributed according to the directional pattern to each of the plurality of radio base stations that simultaneously transmits the signal to the radio terminal, by using multiuser MIMO transmission for performing precoding by a Block Diagonalization Zero-Forcing method.

12. The central station according to claim 7, wherein the delivery section includes:
  a signal distribution section for distributing the selected signal to transmit to the radio terminal according to the selected directional pattern;
  a plurality of modulation sections corresponding to the number of radio terminals that the plurality of radio base stations is capable of holding; and
  a plurality of transmission sections corresponding to the number of radio base stations connected to the central station;
  each of the plurality of modulation sections modulates the selected signal distributed by the signal distribution section; and
  each of the plurality of transmission sections transmits the modulated signal to each of the plurality of radio base stations that simultaneously transmits the selected signal to the radio terminal.

13. A radio base station in a coordinated transmission system in which a plurality of radio base stations simultaneously transmit signals to a radio terminal locating in a first coordinated cluster formed by adjacent sectors of the plurality of radio base stations, comprising:
  a selection section for selecting a first directional pattern or a second directional pattern, wherein the first directional pattern is configured so that for selecting a first directional pattern or a second directional pattern, wherein the first directional pattern is configured so that the plurality of radio base stations transmit first directional beams of a first frequency domain resource toward a center of the first coordinated cluster while not transmitting the first directional beams toward a second coordinated cluster adjacent to the first coordinated cluster, and the second directional pattern is configured so that the plurality of radio base stations transmit second directional beams of a second frequency domain resource toward a center of the second coordinated cluster while not transmitting the second directional beams toward the first coordinated cluster; and a delivery section for distributing a signal to transmit to the radio terminal according to the selected directional pattern, determining a frequency domain and directions of directional beams regarding the distributed signal, and delivering the signal to each of the plurality of radio base stations that simultaneously transmits the signal to the radio terminal.

* * * * *